(12) United States Patent
Umemura et al.

(10) Patent No.: US 7,891,698 B2
(45) Date of Patent: Feb. 22, 2011

(54) AIR BAG MODULE MOUNTED STEERING WHEEL

(75) Inventors: Norio Umemura, Aichi-ken (JP);
Takamitsu Murai, Aichi-ken (JP);
Takamichi Taki, Aichi-ken (JP);
Masakazu Asano, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 113 days.

(21) Appl. No.: 12/222,884

(22) Filed: Aug. 19, 2008

(65) Prior Publication Data
US 2009/0079168 A1 Mar. 26, 2009

(30) Foreign Application Priority Data
Sep. 20, 2007 (JP) ............... 2007-243906

(51) Int. Cl.
*B60R 21/203* (2006.01)
(52) U.S. Cl. .................. 280/728.2; 280/731; 200/61.54
(58) Field of Classification Search ............. 280/728.2, 280/731; 200/61.54, 61.55, 61.56; *B60R 21/203*
See application file for complete search history.

(56) References Cited

U.S. PATENT DOCUMENTS

| | | | | |
|---|---|---|---|---|
| 5,738,369 A | * | 4/1998 | Durrani .................... | 280/731 |
| 5,947,509 A | * | 9/1999 | Ricks et al. ............... | 280/728.2 |
| 6,675,675 B1 | * | 1/2004 | Sauer et al. ................ | 74/552 |
| 6,827,367 B1 | * | 12/2004 | Frisch ...................... | 280/728.2 |
| 2004/0061317 A1 | * | 4/2004 | Ahlquist .................... | 280/731 |
| 2004/0100078 A1 | * | 5/2004 | Schutz et al. ............... | 280/731 |

FOREIGN PATENT DOCUMENTS

| JP | A-2004-256078 | 9/2004 |
|---|---|---|
| JP | A-2004-323010 | 11/2004 |

* cited by examiner

*Primary Examiner*—Paul N Dickson
*Assistant Examiner*—Keith Frisby
(74) *Attorney, Agent, or Firm*—Posz Law Group, PLC

(57) ABSTRACT

A plate is provided on an air bag module, and a first pin on which a recessed portion is formed and a second pin on which a recessed portion is formed are provided in positions which are spaced apart from each other. A first clip adapted to be brought into engagement with the recessed portion and a second clip adapted to be brought into engagement with the recessed portion are provided on a steering wheel main body. In addition, bushes for biasing the plate in a direction in which the plate is separated from the steering wheel main body are provided between a first snap-fit portion which is made up of the first pin and the first clip and a second snap-fit portion which is made up of the second pin and the second clip.

2 Claims, 6 Drawing Sheets

AIR BAG MODULE MOUNTED STEERING WHEEL

BACKGROUND OF THE INVENTION

1. Field of the Invention

The present invention relates to an air bag module mounted steering wheel which includes an air bag module for protecting the head portion and other body portions near the head portion of an occupant who is seated in a driver's seat of a vehicle.

2. Related Art

Conventionally, in air bag module mounted steering wheels of the type described above, there have been proposed to adopt a snap-fit system which makes use of elastic deformations of constituent members for assembling an air bag module onto a steering wheel main body in a convenient manner as a fixing system of the air bag module.

For example, in a steering wheel described in JP-A-2004-323010, two snap-fit portions are provided in positions which are spaced apart from each other, and each of the two snap-fit portions is made up of a clip which is mounted on a steering wheel main body and which deforms elastically and a pin which is provided on an air bag module and which has a recessed portion formed on an outer circumferential surface thereof. Then, when the air bag module is assembled onto the steering wheel main body, the clip and the pin are brought into engagement with each other in each of the snap-fit portions.

In addition, in a steering wheel described in JP-A-2004-256078, two snap-fit portions are provided in positions which are spaced apart from each other, and each of the two snap-fit portions is made up of a claw portion provided on a steering wheel main body and a bar spring provided on an air bag module. Then, when the air bag module is assembled onto the steering wheel main body, the claw portion and the bar spring are brought into engagement with each other in each of the snap-fit portions.

Incidentally, in the steering wheels adopting the snap-fit systems described above, since engagement is performed within the respective snap-fit portions, it is difficult to visualize the engaged conditions of the snap-fit portions. Because of this, for example, it is also difficult to be easily aware of a condition in which one of the snap-fit portions is in engagement, whereas the other snap-fit portion is out of engagement or a condition in which there is occurring an error in assembling the air bag module onto the steering wheel main body, and hence, with those steering wheels, there still exists room for improvement.

SUMMARY OF THE INVENTION

The invention has been made in view of these situations and an object thereof is to provide an air bag module mounted steering wheel which can easily recognize an error in assembling the air bag module onto the steering wheel main body.

With a view to attaining the object, according to the gist of a first aspect of the invention, there is provided an air bag module mounted steering wheel including snap-fit portions provided in positions which are spaced apart from each other for fixing together a steering wheel main body and an air bag module, wherein an elastic member for biasing the air bag module in a direction in which the air bag module is separated from the steering wheel main body is provided between the snap-fit portions which are provided in the positions which are spaced apart from each other.

According to the configuration described above, when one of the snap-fit portions is in an engaged state, whereas the other of the snap-fit portions is out of engagement, the air bag module is made to be inclined by the elastic member provided between the snap-fit portions. More specifically, the air bag module is made to be inclined in such a manner as to be separated from the steering wheel main body on a side of the air bag module where the snap-fit portion which is out of engagement is provided. Consequently, when the air bag module is assembled, in the event that the air bag module is inclined, it can be determined that one of the snap-fit portions must be out of engagement. In particular, in this configuration, since the elastic member is made to be provided between the snap-fit portions, when compared with a case where the elastic member is provided outside the snap-fit portions, the inclination of the air bag module is increased further, and the aforesaid determination can be made more easily. In this way, according to this configuration, since the air bag module is made to be inclined largely when the air bag module is not assembled onto the steering wheel main body correctly, the assemblage of the air bag module onto the steering wheel main body can easily be verified.

In addition, since the normal assemblage of the air bag module onto the steering wheel main body can easily be verified in the way described above, even though the air bag module is assembled improperly, such an assembling error can be verified easily and quickly, whereby the wrongly assembled air bag module can quickly be reassembled for proper assemblage.

Incidentally, in a case where the elastic member is provided outside the respective snap-fit portions, in the event that the elastic member is elongated further, the angle at which the air bag module is inclined can be increased. However, as this occurs, since the repulsive force from the elastic member is increased when attempting to bring the respective snap-fit portions into engagement, there is caused a problem that an assembling load imparted to the air bag module when the engagement operation is carried out is increased. In this respect, according to the configuration described above, since the angle at which the air bag module is inclined can be increased without increasing the length of the elastic member so long, it becomes possible to suppress the increase in assembling load.

In addition, in the engagement process of the snap-fit portions, the engagement operation is carried out while the elastic members are being compressed. Here, in the event that such an elastic member is not provided, a response from the air bag module given when it is pressed is small, and this makes it difficult to obtain or feel a feeling of engagement of the snap-fit portions or a so-called engaging sensation. In this respect, according to the configuration based on the first aspect of the invention, since the elastic member is compressed in the process of bringing the snap-fit portions into engagement, the response felt from the air bag module when it is pressed is increased due to the repulsive force of the elastic member, whereby the engaging sensation can easily be obtained. Consequently, when the assembling worker brings the snap-fit portions into engagement, he or she can obtain or feel the engaging sensation of the snap-fit portions via the repulsing sensation of the elastic members.

In addition, the biasing force is exerted on the air bag module from the elastic member after the assemblage has been completed in the direction in which the air bag module is separated from the steering wheel main body. Since the biasing force acting in one direction is exerted on the air bag module after it has been completely assembled onto the steering wheel main body in the way described above, the looseness of the air bag module relative to the steering wheel main body can be suppressed.

As constituent members of the snap-fit portions, according to a second aspect of the invention, a configuration can be adopted in which the snap-fit portions are each made up of a pin which is provided on the air bag module and in which a recessed portion is formed and a clip which is provided on the steering wheel main body and is adapted to be brought into engagement with the recessed portion on the pin.

According to the gist of a third aspect of the invention, there is provided an air bag module mounted steering wheel as set forth in the second aspect of the invention, wherein letting a line connecting a center point of the pin which makes up one of the snap-fit portions with a center point of the pin which makes up the other of the snap-fit portions be a line L1, a line which intersects the line L1 at right angles and passes the center point of the pin which makes up the one of the snap-fit portions be L2, and a line which intersects the line L1 at right angles and passes through the center point of the pin which makes up the other of the snap-fit portions be L3, the elastic member is provided within an area defined between the line L2 and the line L3.

When the snap-fit portions are each made up of the pin or the like, as according to the configuration described above, by the elastic member being provided between the line L2 and the Line L3, the elastic member can be provided between the snap-fit portions which are provided in the positions which are spaced apart from each other.

According to the gist of a fourth aspect of the invention, there is provided an air bag module mounted steering wheel as set forth in any of the first to third aspects of the invention, wherein a plurality of elastic members like the elastic member described above are provided in directions which intersect the direction in which the snap-fit portions are arranged.

According to the configuration of the fourth aspect of the invention, when one of the snap-fit portions is brought into engagement, the air bag module comes to be supported a multiplicity of points by the plurality of elastic members which are provided in the directions described above. Because of this, when the air bag module is assembled onto the steering main body, the looseness of the air bag module in the directions which intersect the direction in which the snap-fit portions are arranged can preferably be suppressed.

When the elastic members are provided on the steering wheel, as according to a fifth aspect of the invention, a configuration can be adopted in which one end of the elastic member is fixed to the air bag module, and a bearing surface with which the other end of the elastic member is brought into abutment is provided on the steering wheel main body.

In addition, as the elastic members, as according to a sixth aspect of the invention, a configuration can be adopted in which the elastic member is a bush made of rubber.

According to the air bag module mounted steering wheel of the invention, an error in assembling the air bag module onto the steering wheel main body can easily be verified.

BRIEF DESCRIPTION OF THE DRAWINGS

FIG. 5A is a sectional view showing a state resulting before the plate is fixed to the steering wheel main body and FIG. 5B is a sectional view showing a state resulting after the plate has been fixed to the steering wheel main body.

FIG. 6A is a sectional view showing a state resulting before a first snap-fit portion and a second snap-fit portion are brought into engagement, FIG. 6B is a sectional view showing a state in which the first snap-fit portion has been brought into engagement, and FIG. 6C is a sectional view showing a state in which the first snap-fit portion and the second snap-fit portion have been brought into engagement.

DETAILED DESCRIPTION OF THE PREFERRED EMBODIMENTS

Hereinafter, an embodiment in which an air bag module mounted steering wheel according to the invention is embodied will be described by reference to FIGS. 1 to 7.

Figure 1:
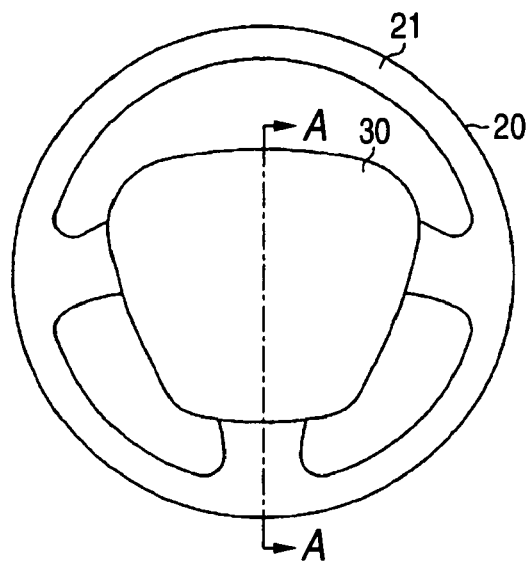
FIG. 1 is a front view of a steering wheel according to one embodiment which embodies the invention.

FIG. 1 shows a front view of a steering wheel according to this embodiment. As shown in FIG. 1, roughly speaking, this steering wheel is made up of a steering wheel main body 20 which includes a rim portion 21 which is formed into an annular shape and the like and an air bag module 30 which accommodates therein an air bag.

Figure 2:
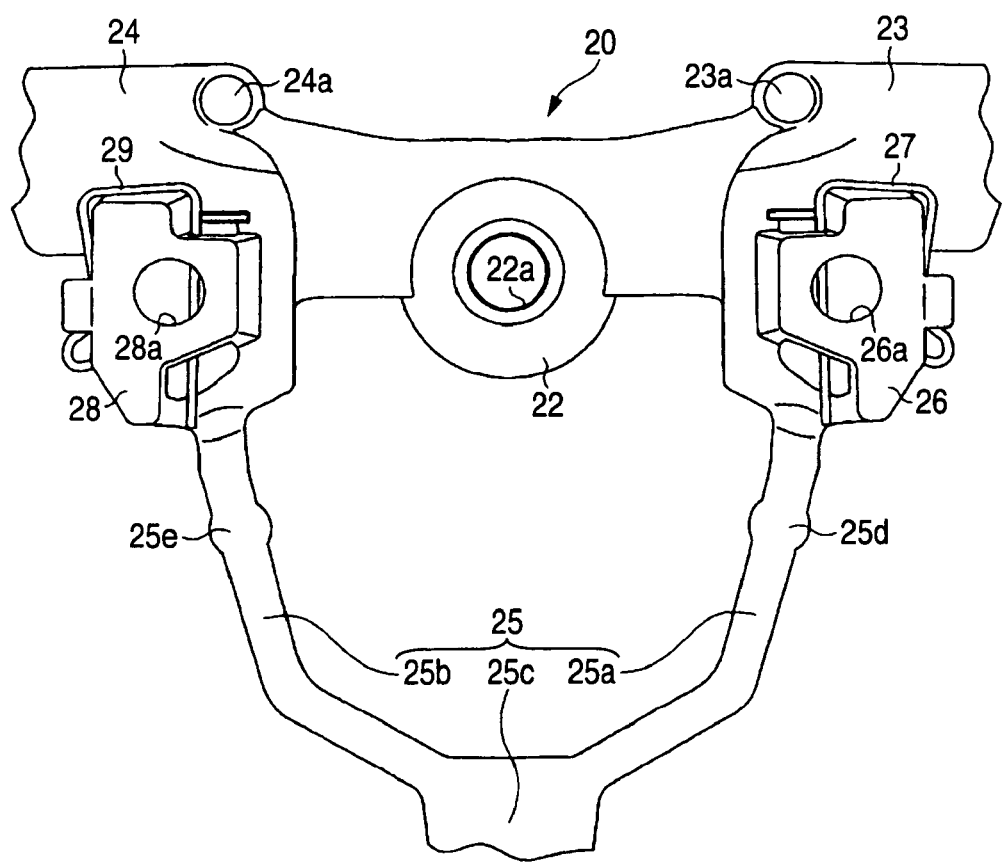
FIG. 2 is a front view showing part of a steering wheel main body according to the embodiment.

FIG. 2 shows a front view of the steering wheel with the air bag module 30 removed therefrom or a front view of the steering wheel main body 20.

As is shown in FIG. 2, the steering wheel main body 20 includes a boss portion core bar 22 which is disposed in the center of the rim portion 21 and which includes a splined portion 22a in which a steering shaft is fitted and first to third spoke portion core bars 23, 24, 25 which connect the boss portion core bar 22 with a rim portion core bar of the rim portion 21. In addition, these boss portion core bar 23, the rim portion core bar and the first to third spoke portion core bars 23, 24, 25 are molded into an integral piece through a die casting method.

The first spoke portion core bar 23 and the second spoke cast core bar 24 are formed in such a manner as to continue substantially in straight line via the boss portion core bar 22 as viewed from the front of the steering wheel, and the rim portion core bar is connected to both ends thereof. On the other hand, the third spoke portion core bar 25 is formed substantially into a Y-shape and is provided to extend in a direction which intersects the direction in which the first and second spoke portion core bars 23, 24 extend substantially at right angles. In addition, this third spoke portion core bar 25 is connected to the first spoke portion core bar 23 at an end portion of a first branch portion 25a thereof, is connected to the second spoke portion core bar 24 at an end portion of a second branch portion 25b and is connected to the rim portion core bar at an end portion of a merging portion 25c between the first branch portion 25a and the second branch portion 25b.

A first fixing portion 26 having formed therein an inserting hole 26a for a first pin 44, which will be described later, and a first clip 27 which is held on the first fixing portion 26 for engagement with the first pin 44 through elastic deformation are provided in the connecting portion between the end portion of the first branch portion 25a and the first spoke portion core bar 23. Similarly, a second fixing portion 28 having formed therein an inserting hole 28a for a second pin 45, which will be described later, and a second clip 28 which is held on the second fixing portion 28 for engagement with the second pin 44 through elastic deformation are provided in the connecting portion between the end portion of the second branch portion 25b and the second spoke portion core bar 24.

In addition a first bearing surface 23a is provided at a root of the first spoke portion core bar 23 which lies above the first fixing portion 26 in such a manner that a first bush 46, which will be described later, is brought into abutment therewith, and a second bearing surface 25d is provided at an intermediate portion along the length of the first branch portion 25a in such a manner that a second bush 47, which will be described later, is brought into abutment therewith. Similarly, a third bearing surface 24a is provided at a root of the second spoke portion core bar 24 which lies above the second fixing portion 28 in such a manner that a third bush 48, which will be described later, is brought into abutment therewith and a fourth bearing surface 25e is provided at an intermediate portion along the length of the second branch portion 25b in such a manner that a fourth bush 49, which will be described later, is brought into abutment therewith.

Figure 3:
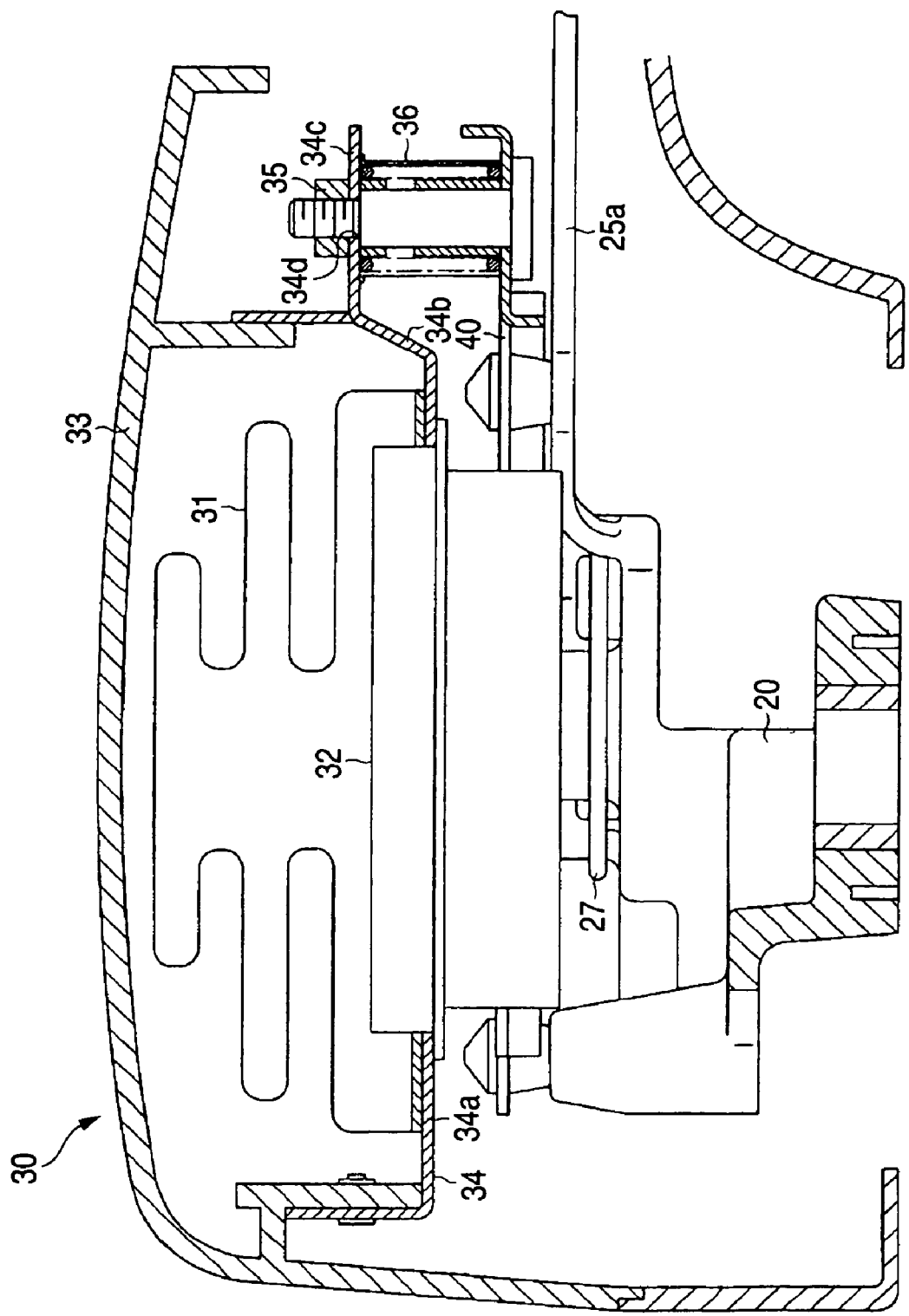
FIG. 3 is a sectional view taken along the line A-A in FIG. 1.

FIG. 3 shows a sectional view taken along the line A-A in FIG. 1. As is shown in FIG. 3, the air bag module 30 includes a bag-shaped air bag 31 which is folded in such a manner as to be inflated, an inflator 32 which supplies gas to the air bag 31, a pad 33 which covers the folded air bag 31 and a bag holder 34 which holds the air bag 31, the inflator 32 and the pad 33. In addition, the air bag module 30 includes a plate 40 for attaching the air bag module 30 to the steering wheel main body 20.

The pad 33 is molded from a resin material, and a thinned portion is formed on a rear surface of the pad 33 in such a manner as to be pushed to be broken when the air bag 31 is inflated and deployed.

The bag holder 34 is made of a metallic material and is formed into a sheet shape. This bag holder 34 includes a bottom portion 34a where the air bag 31 and the inflator 32 are fastened together, a side wall 34b which is provided to be erected from a circumferential edge portion of the bottom portion 34a and a plurality of extended portions 34c which extend from the side wall 34b towards radial directions of the steering wheel main body 20. In addition, the side wall 34b is fixed to a rim portion formed on the pad 33 using an appropriate method.

In addition, a nut 35 is welded to each extended portion 34c and a through hole 34 is also formed therein, which through hole 34 has a diameter substantially the same as an inside diameter of an internal thread on the nut 35. Additionally, the bag holder 34 is connected to the plate 40 via horn switch mechanisms 36 provided integrally on the extended portions 34c. Note that since the horn switch mechanism 36 has a similar configuration to that normally used, the detailed description thereof will be omitted here.

Figure 4:
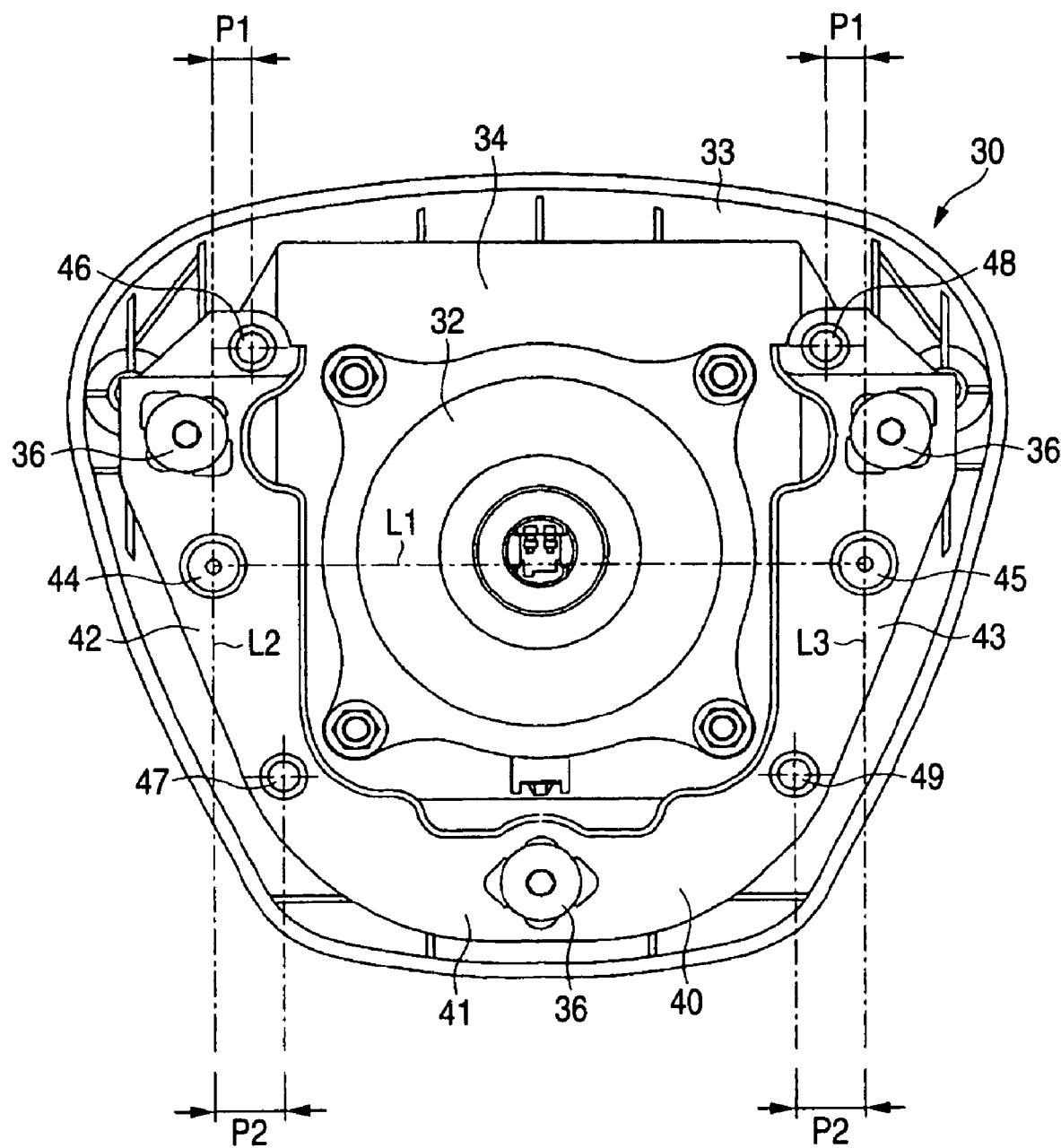
FIG. 4 is a front view of an air bag module according to the embodiment as seen from a rear side of a pad.

FIG. 4 shows a front view of the air bag module 30 which results when it is seen from a rear side of the pad 33. As is shown in FIG. 4, the plate 40 is formed into a substantially U-shaped sheet which is made up of a bottom portion 41, a first extended portion 42 and a second extended portion 43, the first extended portion 42 and the second extended portion 43 being provided in such a manner as to extend upwards from both ends of the bottom portion 41, respectively. In addition, portions of the first extended portion 42 and the second extended portion 43 which lie in the vicinity of respective end portions of the first and second extended portions and a central portion of the bottom portion 41 are connected to the bag holder 34 via the corresponding horn switch mechanisms 36.

The first pin 44, the second pin 45 and the first to fourth bushes 46 to 49 are provided on an opposite side of the plate 40 to a side confronting the bag holder 34 in such a manner as to project therefrom.

The first pin 44, the first bush 46 and the second bush 47 are provided in the vicinity of a central portion of the first extended portion 42, in the vicinity of an end portion of the first extended portion 42 and in the vicinity of the connecting portion between the first extended portion 42 and the bottom portion 41, respectively. Similarly, the second pin 45, the third bush 48 and the fourth bush 49 are provided in the vicinity of a central portion of the second extended portion 43, in the vicinity of an end portion of the second extended portion 43 and in the vicinity of the connecting portion between the second extended portion 43 and the bottom portion 41, respectively.

Furthermore, the first bush 46 to the fourth bush 49 are all provided between the first pin 44 and the second pin 45. More specifically, letting a line connecting a center point of the first pin 44 with a center point of the second pin 45 be defined as a line L1, a line which intersects the line L1 at right angles and passes through the center point of the first pin 44 be defined as a line L2 and a line which intersects the line L1 and passes through the center point of the second pin 45 be defined as a line L3, the first bush 46 to the fourth bush 49 are provided within an area defined between the line L2 and the line L3. Furthermore, far more specifically, the first bush 46 is provided in a position which is spaced apart by a distance P1 inwards of the air bag module 30 from the line L2, and the second bush 47 is provided in a position which is spaced apart by a distance P1 inwards of the air bag module 30 from the line L2. Similarly, the third bush 48 is provided in a position which is spaced apart by a distance P1 inwards of the air bag module 30 from the line L3, and the fourth bush 49 is provided in a position which is spaced apart by a distance P2 inwards of the air bag module 30 from the line L3. Note that while in this embodiment, the distance P1 and the distance P2 are made to differ, they can be made the same.

Figure 5A:
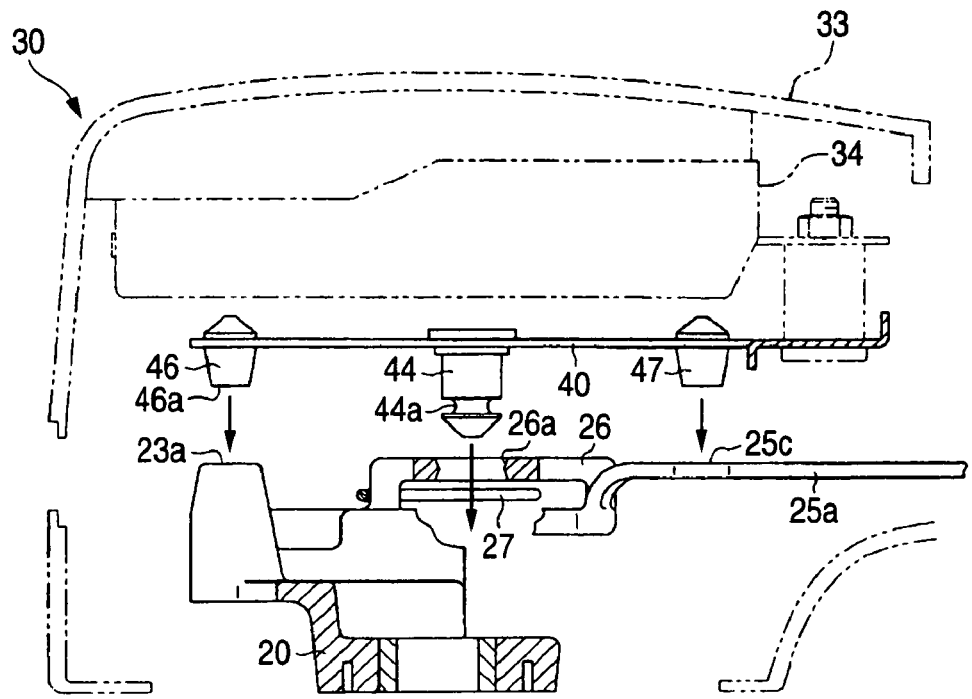
FIGS. 5A and 5B are side views of a first pin, a first bush and a second bush and sectional views showing a mode of attaching a plate to the steering wheel main body.
Figure 5B:
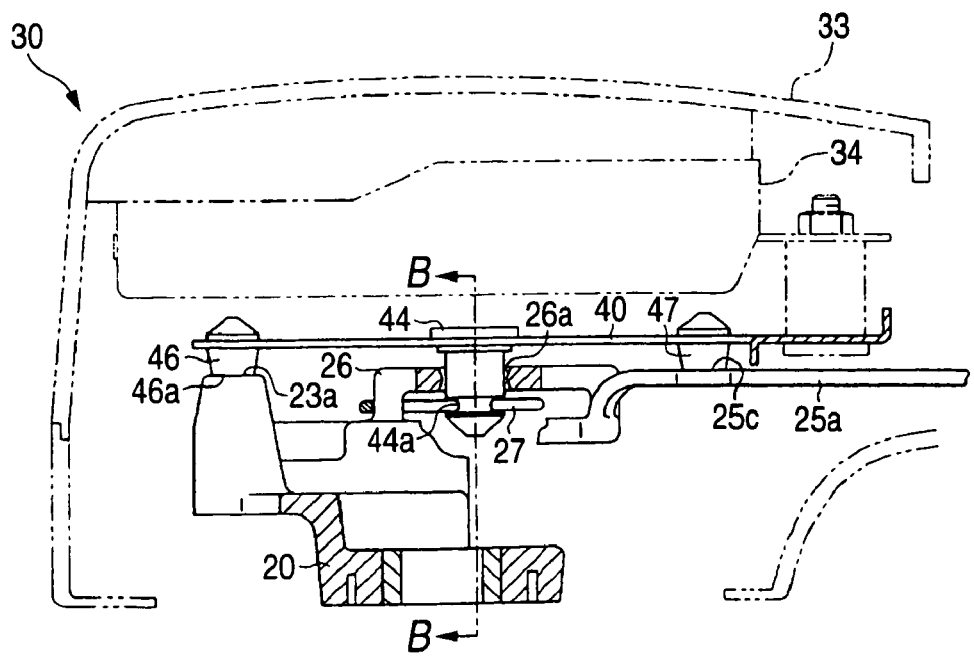

FIGS. 5A and 5B show side views of the first pin 44, the first bush 46 and the second bush 47, as well as a mode in which the plate 40 is attached to the steering wheel main body 20. Note that FIGS. 5A and 5B are made to show diagrams in which part of the constituent members shown in FIG. 3 is omitted or indicated by chain double-dashed lines with a view to illustrating clearly the mode in which the plate 40 is attached to the steering wheel main body 20. In addition, FIG. 5A shows a state resulting before the plate 40 is fixed to the steering wheel main body 20 and FIG. 5B shows a state resulting after the plate 40 has been fixed to the steering wheel main body 20.

As is shown in FIG. 5A, the first pin 44 is made of a metallic material which is formed into a cylindrical shape, and a recessed portion 44a is formed into an annular shape on an outer circumferential surface of the first pin 44. In addition, the first pin 44 is fixed to the plate 40 at one end side thereof, and a distal end portion on the other end side of the first pin 44 is made into a tapered surface. In addition, when the air bag module 30 is pressed against the steering wheel main body 20 in such a state that the inserting hole 26a of the first fixing portion 26 and the first pin 44 are aligned in position with each other, the first clip 27 is brought into engagement with the recessed portion 44a of the first pin 44 which is inserted and passed through the inserting hole 26a as is shown in FIG. 5B.

In addition, although not shown, the second pin 45 is made of the same material as that of the first pin 44, and a recessed portion 45a is formed into an annular shape on an outer circumferential surface thereof. In addition, when the air bag module 30 is pressed against the steering wheel main body 20 in such a state that the inserting hole 28a of the second fixing portion 28 and the second pin 45 are aligned in position with each other, the second clip 29 is brought into engagement with the recessed portion 45a of the second pin 45 which is inserted and passed through the inserting hole 28a. By the first pin 44 and the second pin 45 which are provided on the air bag module 30 being brought into engagement with the first clip 27 and the second clip 28, respectively, which are provided on the steering wheel main body 20, the air bag module 30 is attached to the steering wheel main body 20.

As according to the mode described above, in the embodiment, a first snap-fit portion 100 is made up of the first pin 44 which is provided on the air bag module 30 and on which the recessed portion 44a is formed and the first clip 27 which is provided on the steering wheel main body 20 and which is brought into engagement with the recessed portion 44a of the first pin 44. Similarly, a second snap-fit portion 200 is made up of the second pin 45 which is provided on the air bag module 30 and on which the recessed portion 45a is formed and the second clip 29 which is provided on the steering wheel main body 20 and which is brought into engagement with the recessed portion 45a of the second pin 45. In addition, by the plate 40 provided on the air bag module 30 being assembled onto the steering wheel main body 20 via the first snap-fit portion 100 and the second snap-fit portion 200 which are provided in the positions which are spaced apart from each other, the air bag module 30 is assembled onto the steering wheel main body 20.

The first bush 46 is made of an elastic material which is formed into a cylindrical shape and is fixed to the plate 40 at one end, and a distal end portion 46a on the other end side thereof is made into a flat surface. In addition, in this embodiment, although rubber is adopted as the elastic material, other materials (for example, urethane resin and the like) can be adopted. When assembling the air bag module 30 onto the steering wheel main body 20, the distal end portion 46a is brought into abutment with the first bearing surface 23a. Then, a projecting length (an axial length which projects from the plate 40) of the first bush 46 is set such that the first bush 46 is compressed by a predetermined amount in a process in which the air bag module 30 is fixed to the steering wheel main body 20. Note that the second bush 47 to the fourth bush 49 are also formed from the same material as that of the first bush 46, and when the air bag module 30 is assembled onto the steering wheel main body 20, a distal end portion of the second bush 47, a distal end portion of the third bush 48 and a distal end portion of the fourth bush 49 are brought into abutment with the second bearing surface 25d, the third bearing surface 24a and the fourth bearing surface 25a, respectively. Then, the second bush 47 to the fourth bush 49 are also compressed by the predetermined amount in the process in which the air bag module 30 is fixed to the steering wheel main body 20.

In this way, in the process of assembling the air bag module 30 onto the steering wheel main body 20, the first bush 46 to the fourth bush 49 are compressed, and the first bush 46 to the fourth bush 49 are held in the compressed state even after the assemblage of the air bag module 30 onto the steering wheel main body 20 has been completed. Because of this, since a biasing force which acts in one direction is exerted on the steering wheel main body 20 from the respective bushes 46 to 49, the looseness of the air bag module 30 relative to the steering wheel main body is made to be suppressed.

Figure 6A:
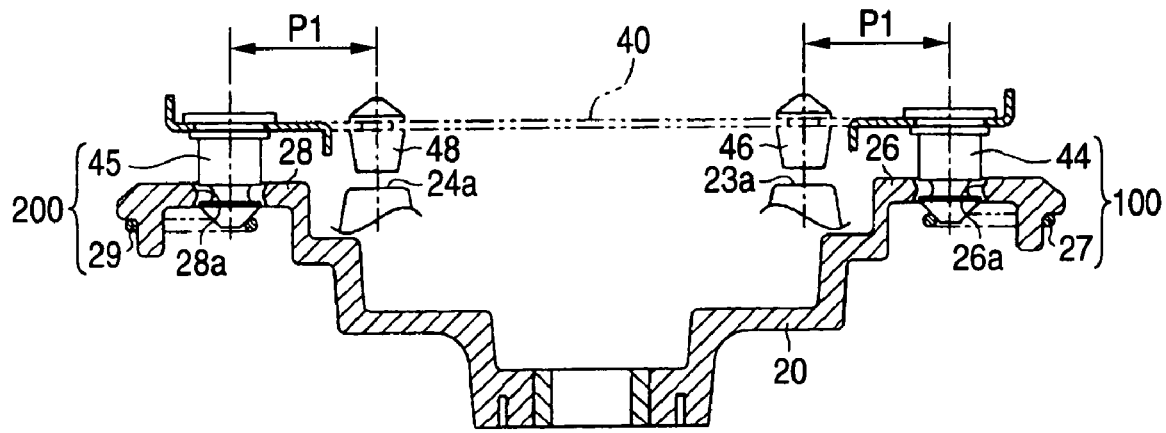
FIG. 6A to 6C are sectional views taken along the line B-B in FIG. 5B.
Figure 6B:
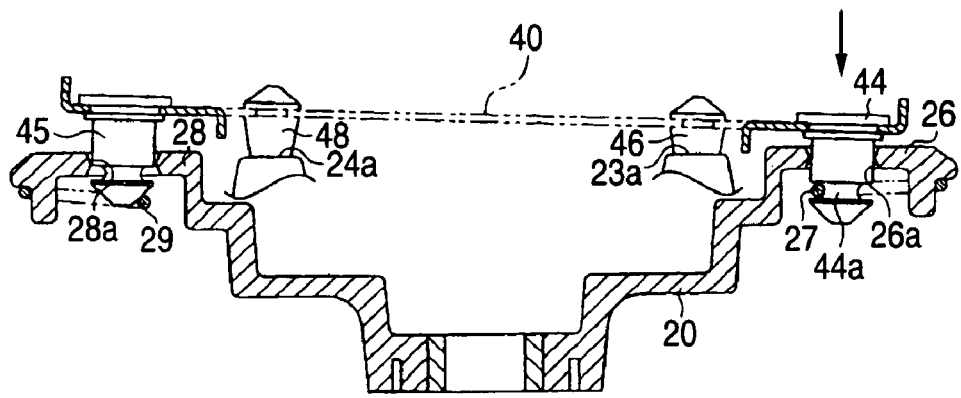
Figure 6C:
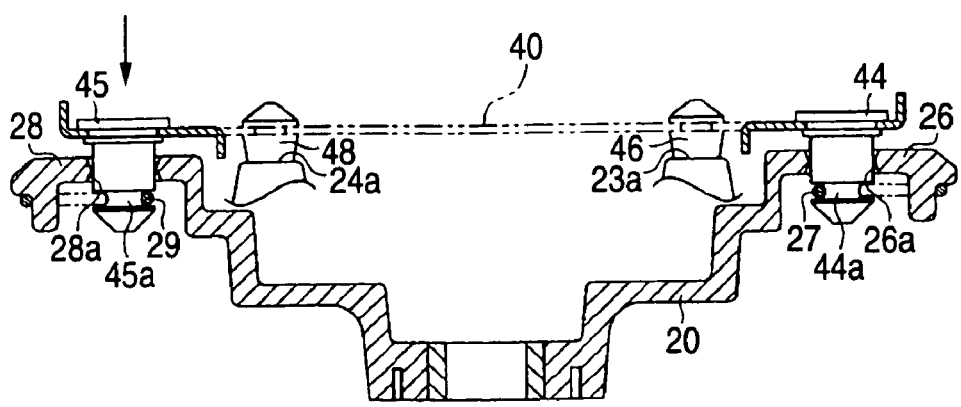

FIGS. 6A to 6C show a procedure of assemblage when the air bag module 30 is assembled onto the steering wheel 20. Note that FIGS. 6A to 6C show sectional views taken along the line B-B in FIG. 5B, which are sectional views showing mainly the periphery of the plate 40 and the steering wheel main body 20 for the purpose of clearly illustrating a mode in which the plate 40 is attached to the steering wheel main body 20.

When the air bag module 30 is assembled onto the steering wheel main body 20, as is shown in FIG. 6A, the distal end portion of the first pin 44 is inserted into the inserting hole 26a in the first fixing portion 26, while the distal end portion of the second pin 45 is inserted into the inserting hole 28a in the second fixing portion 28, whereby the air bag module 30 is positioned relative to the steering wheel main body 20.

Next, as is shown in FIG. 6B, a side of the air bag module 30 where the first pin 44 is provided is pressed, whereby the first pin 44 is inserted further inwards of the inserting hole 26a while expanding the first clip 27. Then, when the first clip 27 and the recessed portion 44a of the first pin 44 are aligned in position with each other, the first clip 27 which has been so expanded is then allowed to restore its original or previous state to thereby be brought into engagement with the recessed portion 44a, whereby the fixing of the air bag module 30 by the first snap-fit portion 100 is completed.

In the engagement process of the first snap-fit portion 100, the engaging operation is performed while the first push 46 and the second bush 47 are being compressed. Here, should the respective bushes not be provided, the response given or felt when pressing the air bag module 30 in the engagement process of the first snap-fit portion 100 is small, and hence, a feeling of engagement of the first snap-fit portion 100 or a so-called sensation of engagement is made difficult to be obtained. In this embodiment, however, since the first bush 46 and the second bush 47 are compressed in the engagement process of the first snap fit portion 100, the response felt when pressing the air bag module 30 is increased by the repulsive force of the first bush 46 and the second bush 47, and hence, the sensation of engagement is made easy to be obtained. In this way, when the assembling worker brings the first snap-fit portion 100 into engagement, he or she can obtain or feel the sensation of engagement of the first snap-fit portion 100 via the repulsive force of the first bush 46 and the second bush 47.

In addition, as is shown in FIG. 4, the first bush 46 and the second bush 47 are provided in a direction which intersects a direction in which the first pin 44 and the second pin 45 are provided, in other words, a direction in which the first snap-fit portion 100 and the second snap-fit portion 200 are provided. Because of this, in the engagement process of the first snap-fit portion 100, the air bag module 30 is supported at a multiplicity of points by the first bush 46 and the second bush 47 which are provided in the intersecting direction. Consequently, when the air bag module 30 is assembled onto the steering wheel main body 20, the looseness of the air bag module 30 in the direction which intersects the direction in which the first snap-fit portion 100 and the second snap-fit portion 200 are provided can be made to be suppressed in an appropriate fashion.

Next, as is shown in FIG. 6C, by a side of the air bag module 30 where the second pin 45 is provided being pressed, the second pin 45 is inserted further inwards of the inserting hole 28a while expanding the second clip 29. In addition, thereafter, when the second clip 29 and the recessed portion 45a of the second pin 45 are aligned in position with each other, the second clip 29 which has been so expanded is brought into engagement with the recessed portion 45a while being allowed to be restored to its original or previous state, whereby the fixing of the air bag module 30 by the second snap-fit portion 200 is also completed.

Also in the engagement process of the second snap-fit portion 200, the engaging operation is performed while the third bush 48 and the fourth bush 49 are being compressed. Consequently, when the assembling worker, brings the second snap-fit portion 200 into engagement, he or she can obtain or feel the sensation of engagement of the second snap-fit portion 200 via the repulsive force of the third bush 48 and the fourth bush 49.

In addition, in the embodiment, as has been described above, the first bush 46 to the fourth bush 49 are all provided between the first pin 44 and the second pin 45 or between the first snap-fit portion 100 and the second snap-fit portion 200, whereby the following function and advantage can be obtained.

Figure 7:
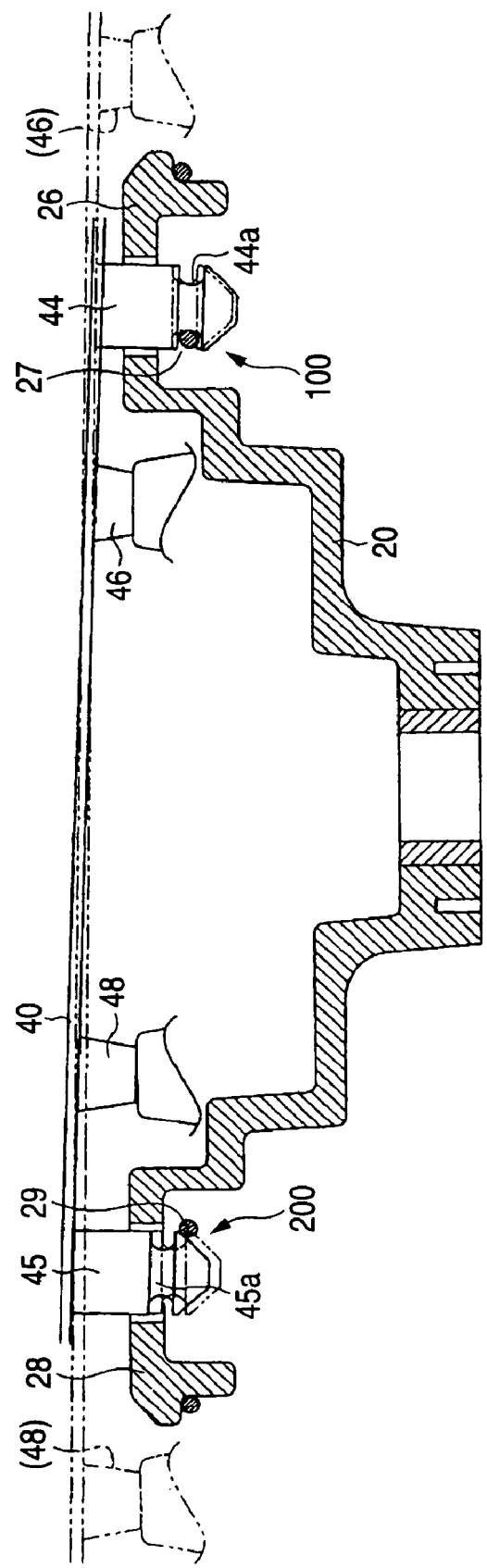
FIG. 7 is an exemplary diagram illustrating the action of the bushes according to the embodiment.

As is shown in FIG. 7, when the first snap-fit portion 100 is in an engaged state, while the second snap-fit portion 200 is out of engagement, the plate 40 is made to be inclined relative to the steering wheel main body 20 by the bushes provided between the respective snap-fit portions, in particular, by the third bush 48 and the fourth bush 49. More specifically speaking, the side of the air bag module 30 where the out-of-engagement state is occurring, which is the side where the second snap-fit portion 200 is provided, comes to be inclined in such a manner as to be spaced apart from the steering wheel main body 20. Consequently, in the event that the air bag module 30 is inclined when the air bag module 30 is assembled, it can be determined that one of the two snap-fit portions (the second snap-fit portion 200 in the state shown in FIG. 7) is out of engagement.

In particular, in this embodiment, the first bush 46 to the fourth bush 49 are provided between the two snap-fit portions. Because of this, as is illustrated by chain double-dashed lines in FIG. 7, when compared with a case where the first bush 46 to fourth bush 49 are provided outside of the respective snap-fit portions, the angle at which the air bag module 30 is inclined is increased when one of the two snap-fit portions is out of engagement, whereby the determination of the occurrence of such an out-of-engagement state can easily be made. In this way, since the air bag module 30 is inclined largely when the air bag module 30 is not assembled onto the steering wheel main body 20 correctly, an error in assembling the air bag module 30 onto the steering wheel main body 20 can easily be identified. Then, since whether or not the air bag module 30 is assembled into the proper state can easily be identified, even though the air bag module 30 is assembled erroneously, the error in assemblage can be identified easily and quickly, whereby the air bag module 30 can be reassembled into the proper state without any delay.

In addition, as is illustrated by the chain double-dashed lines in FIG. 7, even when the first bush 46 to the fourth bush 49 are provided outside the respective snap-fit portions, in the event that projecting lengths of the respective bushes are increased, the inclination angle of the air bag module 30 can be increased. As this occurs, however, since the repulsive force from the respective bushes when the first snap-fit portion 100 and the second snap-fit portion are brought into engagement is increased, there is caused a problem that an inserting load given to the first pin 44 and the second pin 45 (an assembling load given to the air bag module 30) when the engaging operation is performed becomes high. In this respect, in the embodiment, since the inclination angle of the air bag module 30 can be increased without increasing the projection length of the respective bushes so much, the increase in inserting load can also be suppressed.

Thus, as has been described heretofore, according to the embodiment, the following advantages can be obtained.

(1) The first bush 46 to the fourth bush 49, which are all made from rubber, are provided as the elastic members for biasing the air bag module 30 in the direction in which the air bag module 30 is spaced apart from the steering wheel main body 20, and these bushes are provided between the first snap-fit portion 100 and the second snap-fit portion which are provided in the positions which are spaced apart from each other.

More specifically, the first snap-fit portion 100 is made to be made up of the first pin 44 which is provided on the air bag module 30 and on which the recessed portion 44a is formed and the first clip 27 which is provided on the steering wheel main body 20 and is adapted to be brought into engagement with the recessed portion 44a of the first pin 44. In addition, the second snap-fit portion 200 is made to be made up of the second pin 45 which is provided on the air bag module 30 and on which the recessed portion 45a is formed and the second clip 29 which is provided on the steering wheel main body 20 and is adapted to be brought into engagement with the recessed portion 45a of the second pin 45. In addition, letting the line which passes through the center point of the first pin 44 and the center point of the second pin 45 be defined as the line L1, the line which intersects the line L1 at right angles and passes through the center point of the first pin 44 be defined as the line L2 and the line which intersects the line L1 at right angles and passes through the center point of the second pin 45 be defined as the line L3, the first bush 46 to the fourth bush 49 are made to be provided within the area defined between the line L2 and the line L3.

Since the first bush 46 to the fourth bush 49 are made to be provided in such positions, when one of the two snap-fit portions is in the engaged state, while the other snap-fit portion is out of engagement, in other words, when the air bag module 30 is not assembled onto the steering wheel main body 20 correctly, the air bag module 30 is made to be inclined largely. Consequently, the error in assembling the air bag module 30 onto the steering wheel main body 20 can easily be identified. In addition, since whether or not the air bag module 30 is assembled onto the steering wheel main body 20 in the normal state can easily be identified in the way described above, even though the air bag module 30 is erroneously assembled onto the steering wheel main body 20, the error in assemblage can be identified easily and quickly, and the air bag module 30 can be reassembled into the proper state without any delay.

In addition, since the inclination angle of the air bag module 30 can be increased without increasing the projecting length of the first bush 46 to the fourth bush 49 so much, the increase in assembling load when the air bag module 30 is assembled onto the steering wheel main body 20 can also be suppressed.

In addition, when the assembling worker brings the first snap-fit portion 100 into engagement, he or she can obtain or feel the sensation of engagement of the first snap-fit portion 100 via the repulsive force of the first bush 46 and the second bush 47. Similarly, when the assembling worker brings the second snap-fit portion 200 into engagement, he or she can obtain or feel the sensation of engagement of the second snap-fit portion 200 via the repulsive force of the third bush 48 and the fourth bush 49.

In addition, the biasing force is exerted on the air bag module 30 which has been assembled completely from the first bush 46 to the fourth bush 47 in the direction in which the air bag module 30 is separated apart from the steering wheel main body 20. Since the biasing force which acts in one direction is applied to the air bag module 30 that has been assembled completely, the looseness of the air bag module 30 relative to the steering wheel main body 20 is made to be suppressed.

(2) The first bush 46 and the second bush 47 are provided in the direction which intersects at right angles the direction in which the first snap-fit portion 100 and the second snap-fit portion 200 are provided. Similarly, the third bush 48 and the fourth bush 49 are provided in the direction which intersects at right angles the direction in which the first snap-fit portion 100 and the second snap-fit portion 200 are provided. Because of this, when one of the two snap-fit portions is brought into engagement, the air bag module 30 is supported at the multiplicity of points by the plurality of bushes which are provided in the intersecting directions. Consequently, when the air bag module 30 is assembled onto the steering wheel main body 20, the looseness of the air bag module 30 in the direction which intersects the direction in which the first snap-fit portion 100 and the second snap-fit portion 200 are provided can preferably be suppressed.

In addition, the invention can be embodied into other embodiments which will be described below.

In the assembling procedure shown previously in FIGS. 6A to 6C, while the first snap-fit portion is made to be brought into engagement firstly, even though the second snap-fit portion 200 is made to be brought into engagement first, the same function and advantage can be obtained.

While the bushes are provided between the first snap-fit portion 100 and the second snap-fit portion 200 as the elastic members, spring members may be provided.

The first bush 46 to the fourth bush 49 may be made to be provided on the steering wheel main body 20 and the bearing surfaces with which the respective bushes are brought into abutment may be made to be provided on the air bag module 30.

Any of the first bush 46 to the fourth bush 49 may be provided on the air bag module 30 and the remaining bushes may be provided on the steering wheel main body 20. In addition, the bearing surfaces corresponding to the bushes, respectively, may be provided on the steering wheel main body 20 or the air bag module 30.

While the four bushes are provided between the first snap-fit portion 100 and the second snap-fit portion 200, the number of bushes so provided can be modified as required. In addition, the positions where the bushes are provided can be modified as required as long as they stay between the first snap-fit portion 100 and the second snap-fit portion 200.

The first pin 44 and the second pin 45 may be provided on the steering wheel main body 20, and a construction may be provided on the plate 40 which corresponds to the first fixing portion 26 where the first clip 27 is provided and the second fixing portion 28 where the second clip 29 is provided.

While the snap-fit portion is made to be made up of the pin on which the recessed portion is formed and the clip which is adapted to be brought into engagement with the recessed portion so formed, a snap-fit portion may be provided which has another construction.

The number of snap-fit portions provided may be modified as required.

While the steering wheel of the embodiment is such as to have the three spoke portions, the number of spoke portions is not limited thereto, and the shape of the steering wheel is also not limited to that described in this embodiment.

What is claimed is:

1. An air bag module mounted steering wheel, which comprises:

a steering wheel main body, an air bag module including a plate and a bag holder, the plate arranged adjacent the steering wheel main body, and the bag holder arranged behind the plate relative to the steering wheel main body, a horn switch mechanism arranged between the bag holder and the plate, snap-fit portions for fixing together the steering wheel main body and the air bag module, the snap-fit portions having engaging portions affixed to the plate, the snap-fit portions are spaced apart and define a first line therebetween, the snap-fit portions further define second lines that are parallel to each other and perpendicular to the first line, and a plurality of elastic members fixed on the plate for biasing the air bag module in a direction that separates the air bag module from the steering wheel main body, the elastic members are provided in directions that intersect the first line defined by the snap-fit portions, the elastic members having engaging portions for affixing the elastic members to the plate; the elastic members are arranged within an area bordered by the second lines defined by the snap-fit portions, one end of the elastic members is fixed to the air bag module, a bearing surface of another end of the elastic members abuts the steering wheel main body, and the elastic members are arranged opposite to the horn switch mechanism with respect to the plate, wherein when all the engaging portions of the snap-fit portions are engaged such that the steering wheel main body and the airbag module are fixed together, the plate of the airbag module is equally distanced from the steering wheel main body such that the plate and the steering wheel main body are in parallel, and when at least one of the snap-fit portions is engaged and at least another one of the snap-fit portions is not engaged, the plate of the airbag module is inclined relative to the steering wheel main body.

2. The air bag module mounted steering wheel as set forth in claim 1, wherein the snap-fit portions are each made up of a pin which is provided on the air bag module and in which a recessed portion is formed and a clip which is provided on the steering wheel main body and is adapted to be brought into engagement with the recessed portion of the pin.

* * * * *